United States Patent [19]

Harkonen

[11] Patent Number: 5,611,422
[45] Date of Patent: Mar. 18, 1997

[54] MATERIALS CARRYING APPARATUS

[75] Inventor: Jorma O. Harkonen, Matthews, N.C.

[73] Assignee: Fab-Tech Industries, Inc., Charlotte, N.C.

[21] Appl. No.: 397,432

[22] Filed: Mar. 1, 1995

[51] Int. Cl.$^6$ .................................................... B65G 1/10
[52] U.S. Cl. ....................... 198/681; 198/817; 198/346.1; 198/485.1; 414/331; 414/924
[58] Field of Search ............................. 198/804, 810.01, 198/817, 832, 836.1, 603, 678.1, 680, 681, 469.1, 485.1, 341, 346.1, 346.3; 414/331, 924; 187/254, 266

[56] References Cited

U.S. PATENT DOCUMENTS

| | | | |
|---|---|---|---|
| 1,504,886 | 8/1924 | Gibbs | 198/817 |
| 1,705,010 | 3/1929 | Garvey, Jr. et al. | |
| 1,738,569 | 12/1929 | Fuller | 198/817 |
| 1,920,981 | 8/1933 | Gibbs | 198/817 |
| 2,276,127 | 3/1942 | Wahl | |
| 2,603,372 | 7/1952 | Ketchpel | |
| 2,829,780 | 4/1958 | Boor | 198/681 X |
| 3,126,114 | 3/1964 | Nakahara | 198/681 X |
| 3,241,689 | 3/1966 | Verrinder | 414/924 X |
| 3,482,720 | 12/1969 | Tax et al. | |
| 3,494,491 | 2/1970 | Sumida | |
| 3,675,739 | 7/1972 | Erlinder | |
| 3,905,496 | 9/1975 | Reeder | |
| 3,944,046 | 3/1976 | Kubicek | 198/817 X |
| 4,055,257 | 10/1977 | Krebs | 414/924 X |
| 4,466,530 | 8/1984 | Stückler | 198/346.1 |
| 4,546,891 | 10/1985 | Lanigan, Sr. et al. | 212/221 |
| 4,701,096 | 10/1987 | Fisher, Jr. | 198/346.1 X |
| 4,715,762 | 12/1987 | Lanigan, Sr. et al. | 414/126 |
| 4,854,804 | 8/1989 | Mayle | 414/469 |
| 4,941,645 | 7/1990 | Hall | 254/324 |
| 5,498,122 | 3/1996 | Miura et al. | 414/924 X |

FOREIGN PATENT DOCUMENTS 3743237  7/1989  Germany ................ 198/485.1

*Primary Examiner*—Frank E. Werner
*Attorney, Agent, or Firm*—W. Thad Adams, III, P.A.

[57] ABSTRACT

A materials carrying apparatus and method is provided. The apparatus includes a frame. A first carrier is supported within the frame for carrying materials thereon. The first carrier is located in an access position for access to and use of the materials by a user. A second carrier is supported within the frame and located in a storage position for carrying materials thereon. The storage position is vertically spaced apart from the access position. An elevator assembly vertically moves the second carrier from the storage position into the access position when the materials of the first carrier have been exhausted.

11 Claims, 7 Drawing Sheets

MATERIALS CARRYING APPARATUS

TECHNICAL FIELD AND BACKGROUND OF THE INVENTION

This invention relates to a materials carrying apparatus and method, and is especially applicable for use in assembly-line construction. The invention saves energy and time by supplying a sufficient amount of parts and materials to a worker to last an entire work shift. The invention provides convenient access to the materials being used, and makes efficient use of the work area by loading the materials on vertically spaced carriers.

According to some prior art devices, several carriers are supported within a frame and travel in an endless loop carrying materials to be used by the worker. Because of the circular motion of the carriers, such devices are generally termed "carrousels". Carrousels are relatively large and bulky, and consume a relatively large area of work space. In addition, carrousels generally cannot be adapted to support additional or fewer carriers within the frame depending upon the length of the work shift and the particular needs of the user.

The present invention addresses these and other problems of the prior art by providing an apparatus which is relatively compact, and requires relatively little space in the work area. The invention is easily modified to increase or decrease its materials carrying capacity as desired by the worker or work group.

SUMMARY OF THE INVENTION

Therefore, it is an object of the invention to provide a materials carrying apparatus for use in assembly-line construction.

It is another object of the invention to provide a materials carrying apparatus which saves labor costs, time, and energy by supplying enough materials to a worker to last an entire work shift without the materials needing to be replenished during the shift.

It is another object of the invention to provide a materials carrying apparatus which can be easily modified to increase or decrease its materials carrying capacity as desired by the user.

These and other objects of the present invention are achieved in the preferred embodiments disclosed below by providing a materials carrying apparatus including a frame. A first carrier is supported within the frame for carrying materials thereon. The first carrier is located in an access position for access to and use of the materials by a user. A second carrier is supported within the frame and located in a storage position for carrying materials thereon. The storage position is vertically spaced apart from the access position. Elevator means vertically moves the second carrier from the storage position into the access position when the materials of the first carrier have been exhausted.

According to one preferred embodiment of the invention, the elevator means includes a motor and a drive shaft actuated by the motor.

According to another preferred embodiment of the invention, the elevator means further includes a drive wheel, sprocket means connected to the drive wheel, and a traveling chain engaging the sprocket means and carrying the second carrier. The drive wheel is operatively connected to the drive shaft and cooperates with the sprocket means and the traveling chain for vertically moving the second carrier between the storage position and the access position.

According to yet another preferred embodiment of the invention, attachment means attaches the second carrier to the traveling chain.

According to yet another preferred embodiment of the invention, stop means stops the vertical movement of the second carrier as the second carrier moves from the storage position into the access position.

Preferably, the stop means is a limit switch.

According to another preferred embodiment of the invention, second stop means stops the vertical movement of the second carrier as the second carrier returns from the access position to the storage position.

Preferably, the second stop means is a limit switch.

According to another preferred embodiment of the invention, a third carrier is supported within the frame and located in a second storage position for carrying materials thereon. The second storage position is vertically spaced apart from the access position and the first storage position. The elevator means moves the second and third carriers successively into the access position when the materials of the first carrier have been exhausted.

According to yet another preferred embodiment of the invention, removable attachment means removably attaches the third carrier to the traveling chain.

According to yet another preferred embodiment of the invention, the access position defines a materials loading position.

An embodiment of the method according to the invention comprises the steps of loading the materials to be carried on first and second carriers. The first carrier is located in an access position for access to and use of the materials by a user. The second carrier is located in a storage position vertically spaced apart from the first carrier in the access position. The second carrier is moved vertically from the storage position to the access position when the materials of the first carrier have been exhausted.

According to another preferred embodiment of the invention, the method includes the step of locating a third carrier in a second storage position for carrying materials thereon. The second storage position is vertically spaced apart from the access position and the first storage position. The second and third carriers are moved successively into the access position when the materials of the first carrier have been exhausted.

BRIEF DESCRIPTION OF THE DRAWINGS

Some of the objects of the invention have been set forth above. Other objects and advantages of the invention will appear as the invention proceeds when taken in conjunction with the following drawings, in which.

DESCRIPTION OF THE PREFERRED EMBODIMENT AND BEST MODE

Figure 1:
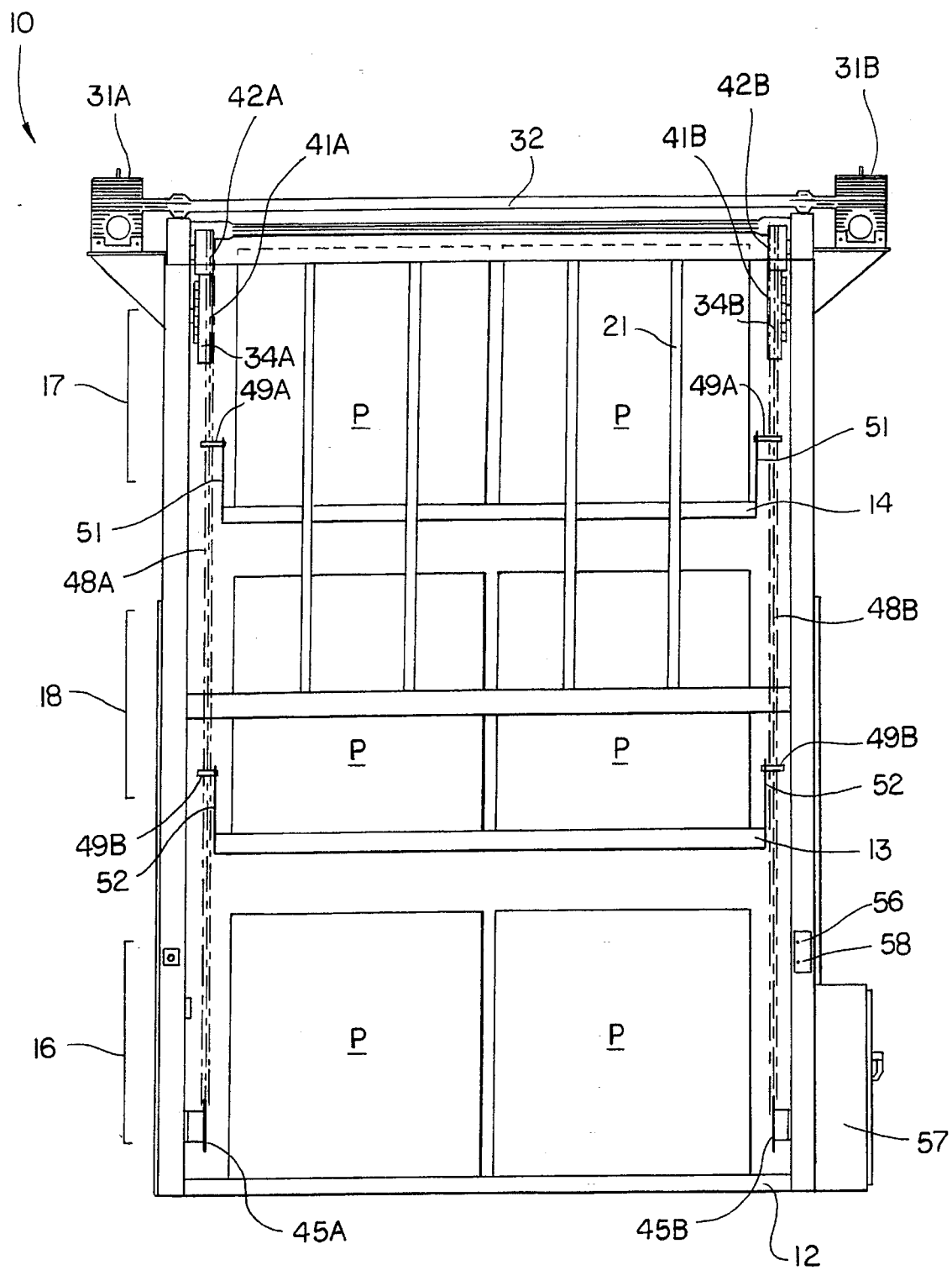
FIG. 1 is a front elevational view of the materials carrying apparatus according to one preferred embodiment, and showing the apparatus in a fully loaded condition.

Referring now specifically to the drawings, a materials carrying apparatus according to the present invention is illustrated in FIG. 1 and shown generally at reference numeral 10. The apparatus 10 is especially useful for carrying materials for use by workers in assembly-line construction. For example, the apparatus 10 may carry automobile assembly parts for being removed and installed by workers on automobiles being assembled. The apparatus 10 is loaded to supply enough materials to the worker for an entire work shift.

Figure 2:
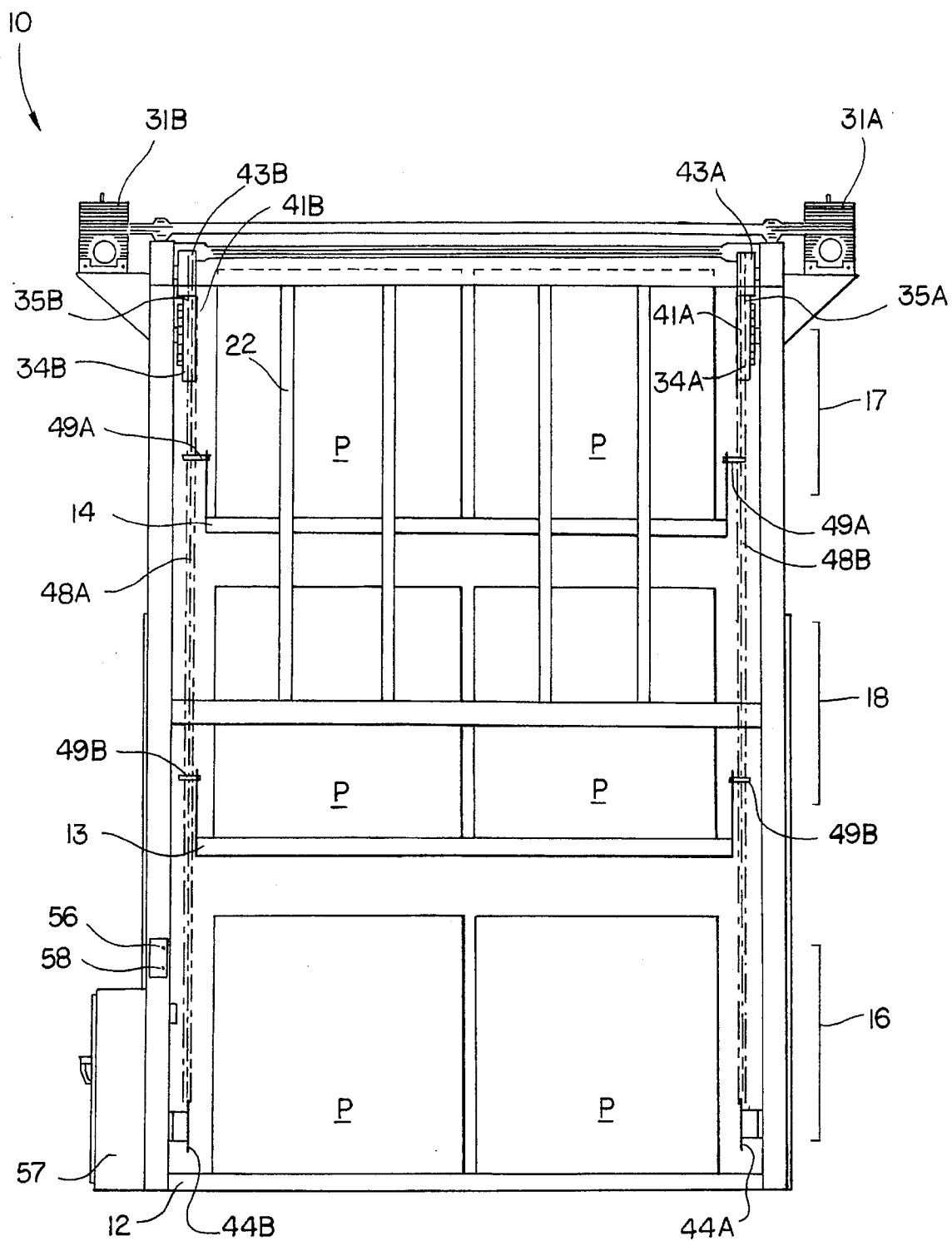
FIG. 2 is a back elevational view of the materials carrying apparatus showing the apparatus in a fully loaded condition.

As shown in FIGS. 1 and 2, the apparatus 10 includes a frame 11, and bottom, middle, and top carriers 12, 13, and 14 supported within the frame 11 for carrying materials. Preferably, the materials are transported to and stored on the carriers 12, 13, and 14 in pallets "P". Although only three carriers 12, 13, 14 are shown, the apparatus 10 may be constructed to accommodate any desired number of carriers. Preferably, the bottom carrier 12 is secured directly to the base of the frame 11.

When the apparatus 10 is fully loaded, the carriers 12, 13, 14 are located in a worker access position 16 at the base of the frame, a first storage position 17 in an upper section of the frame, and a second storage position 18 intermediate the access position 16 and the first storage position 17. According to one embodiment, the materials are loaded onto the carriers 12, 13, and 14 at the worker access position 16, and then moved upwardly to the first and second storage positions 17 and 18. Elevator means, described below, operates to move the middle and top carriers 13 and 14 vertically from their respective positions within the frame 11 to the access position 16 when the materials of the bottom carrier 12 have been exhausted by the worker.

Figure 7:
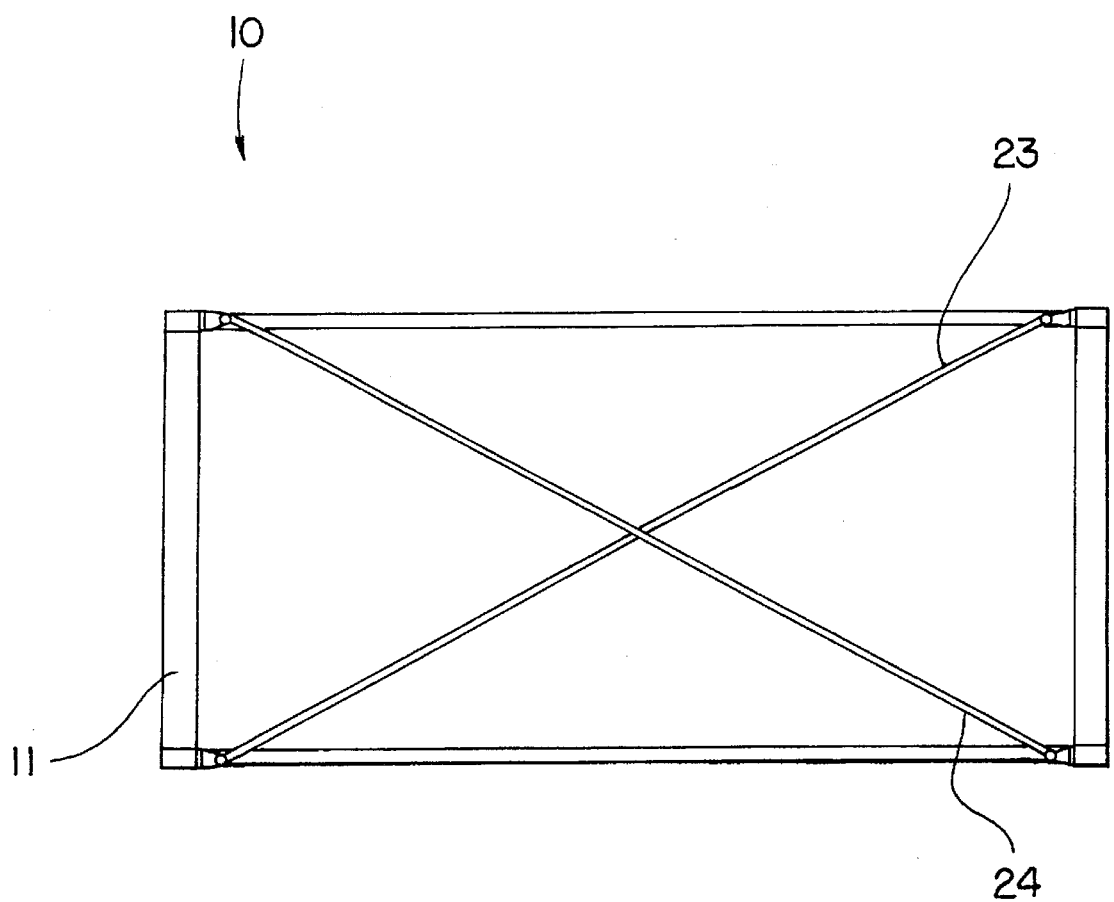
FIG. 7 is a top plan view of the apparatus with the motors, drive shaft, and other interior elements removed to illustrate the diagonal support rods of the frame.

A front and rear safety gate 21 and 22 prevent materials from accidentally falling from the middle and top carriers 13 and 14 into the work area, while the sides of the apparatus 10 may include expanded metal covers (not shown). In addition, the apparatus 10 preferably includes diagonally extending support rods 23 and 24 located at a top end of the apparatus 10 for stabilizing the frame 11. The diagonal support rods 23 and 24 are shown in FIG. 7.

Elevator Means

Figure 3:
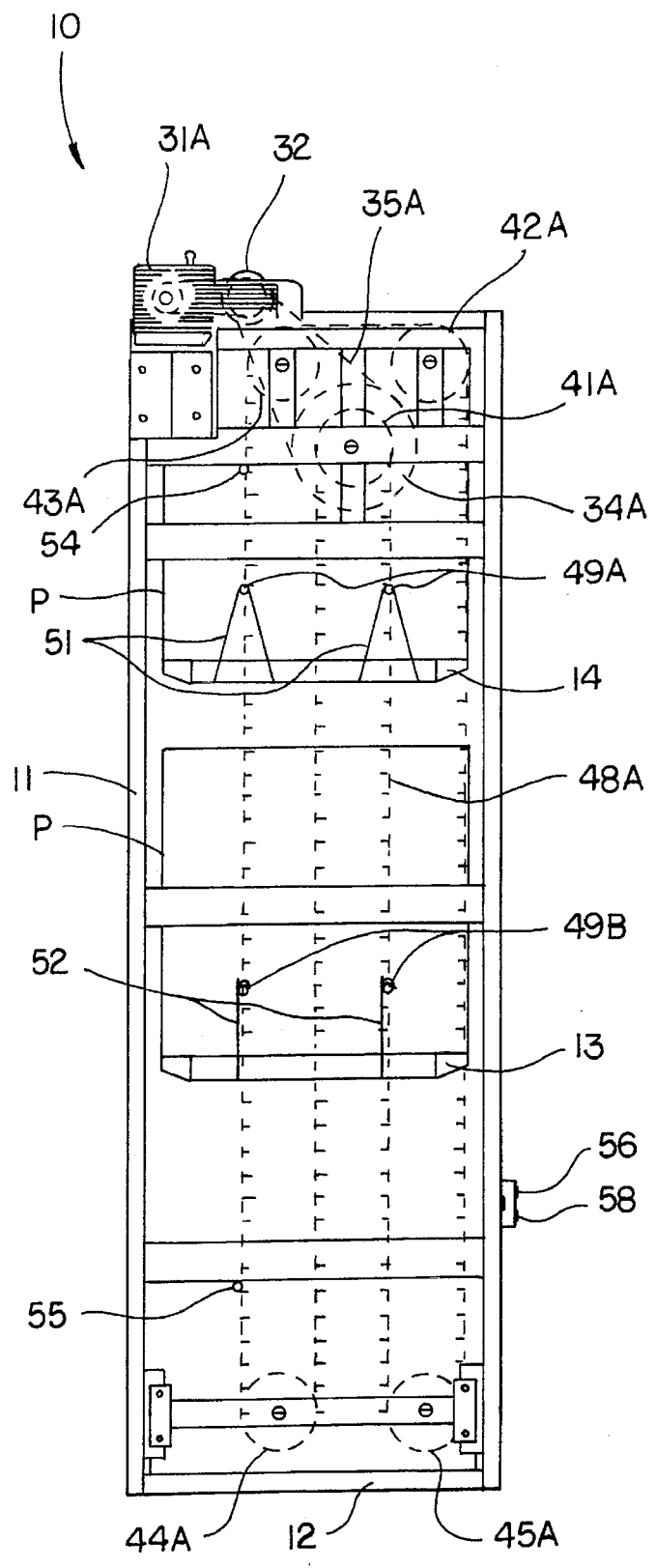
FIG. 3 is a right side elevational view of the materials carrying apparatus with the pallets of the bottom carrier removed, and illustrating the elevator means for lifting and lowering the carriers.
Figure 4:
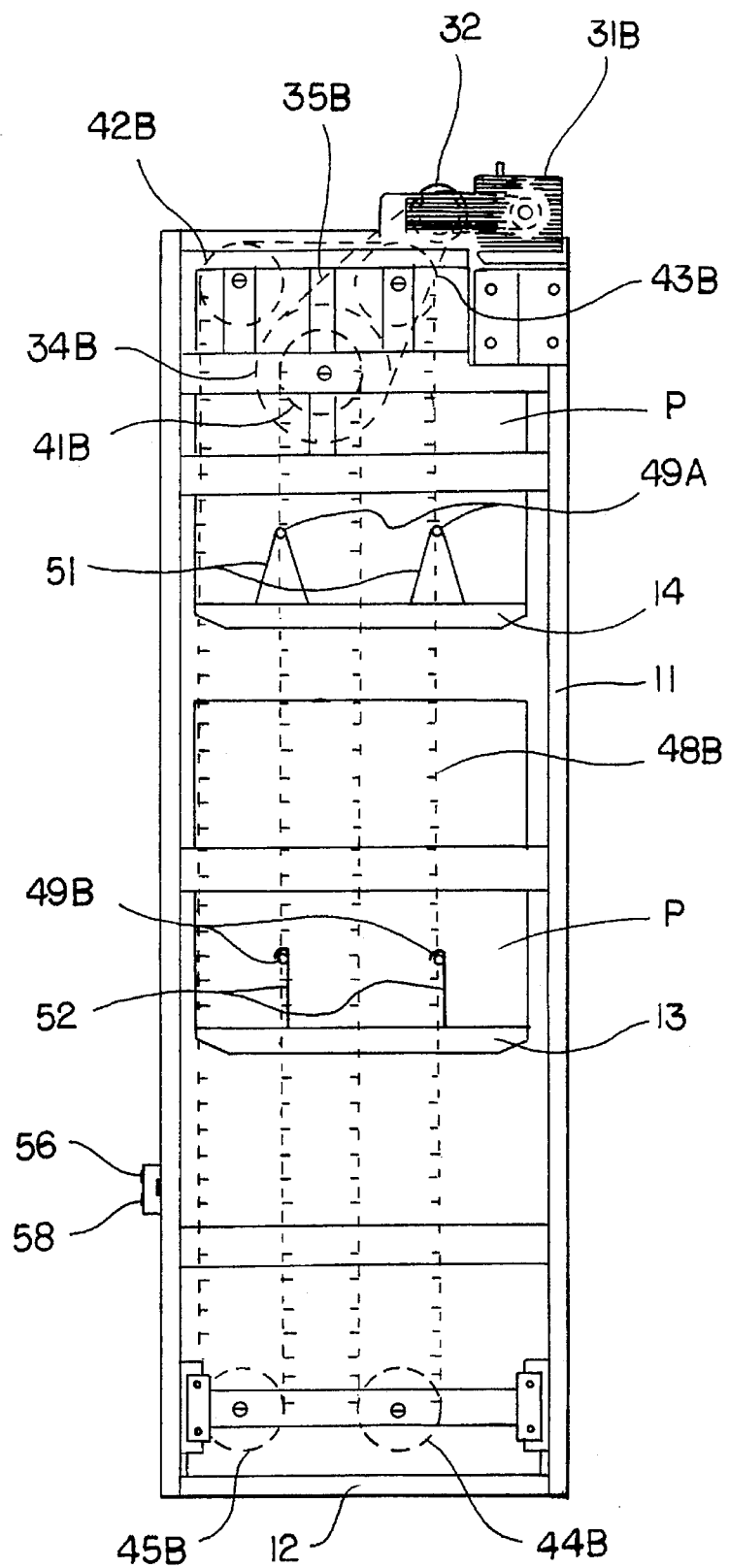
FIG. 4 is a left side elevational view of the materials carrying apparatus with the pallets of the bottom carrier removed, and illustrating the elevator means for lifting and lowering the carriers.

The elevator means of the apparatus 10 includes first and second opposing gear motors 31A and 31B mounted on a top end of the frame 11, and cooperating to rotate a chain-driven drive shaft 32 extending laterally between the motors 31A and 31B. As best shown in FIGS. 3 and 4, the drive shaft 32 is operatively connected to opposing drive wheels 34A and 34B by chains 35A and 35B. The drive wheels 34A and 34B actuate an assembly of sprockets 41A, 41B, 42A, 42B, 43A, 43B, 44A, 44B, 45A, 45B and travel chains 48A and 48B. Operation of the drive wheel 34A and travel chain 48A is described below. The drive wheel 34B and travel chain 48B operate in an identical manner with identical sprockets.

Referring to FIG. 3, the drive wheel 34A is connected to the sprocket 41A, and causes rotation of the sprocket 41A upon actuation of the drive shaft 32. The travel chain 48A extends around the sprocket 41A and the sprockets 42A, 43A, 44A, 45A for movement in an endless loop.

The opposing gear motors 31A and 31B control the direction of rotation of the drive shaft 32, and the vertical movement of the middle and top carriers 13 and 14 within the frame 11. Counterclockwise rotation of the drive shaft 32 and wheels 34A and 34B drives the travel chains 48A and 48B, and causes the carriers 13 and 14 to simultaneously move upwardly within the frame 11. Clockwise rotation of the drive shaft 32 and wheels 34A and 34B cause the carriers 13 and 14 to move downwardly. Preferably, limit switches 54 and 55 are located at the upper and lower sections of the frame 11 for stopping the upward and downward movement of the carriers 13 and 14.

First and second sets 49A and 49B of inwardly-projecting chain pins are connected to the travel chains 48A and 48B, and act to engage and move the middle and top carriers 13 and 14 vertically within the frame 11 as the travel chains 48A and 48B move along their respective paths on opposite sides of the frame 11. Preferably, each set 49A and 49B includes four chain pins; two being located on each side of the carrier 13 and 14.

The first set 49A of chain pins projects inwardly a predetermined distance to engage pairs of opposing angled support bars 51 attached to opposite sides of the top carrier 14. The second set 49B of chain pins projects inwardly a shorter distance than the first set 49A, and engages opposing pairs of connecting hooks 52 attached to opposite sides of the middle carrier 13. The top carrier 14 preferably has a smaller lengthwise dimension than the middle carrier 13, and nests between the connecting hooks 52 of the middle carrier 13 when lowered into the access position 16 within the frame 11.

In an alternative embodiment (not shown), the elevator means may include one or more hoist cables connected to the carriers and to the drive shaft for lifting and lowering the carriers into the desired positions. A crank arm may be used to manually actuate the drive shaft.

Operation of the Apparatus 10

At the beginning of a work shift, each carrier 12, 13, and 14 is loaded with materials for use during the shift and moved to its respective position within the frame 11, as shown in FIGS. 1 and 2. When the materials of the bottom carrier 12 in the access position 16 have been exhausted by the worker, the worker activates a control mechanism 56 located on the frame 11. The control mechanism 56 is electrically connected to a control panel 57 and the gear motors 31A and 31B, and triggers operation of the elevator means.

Figure 5:
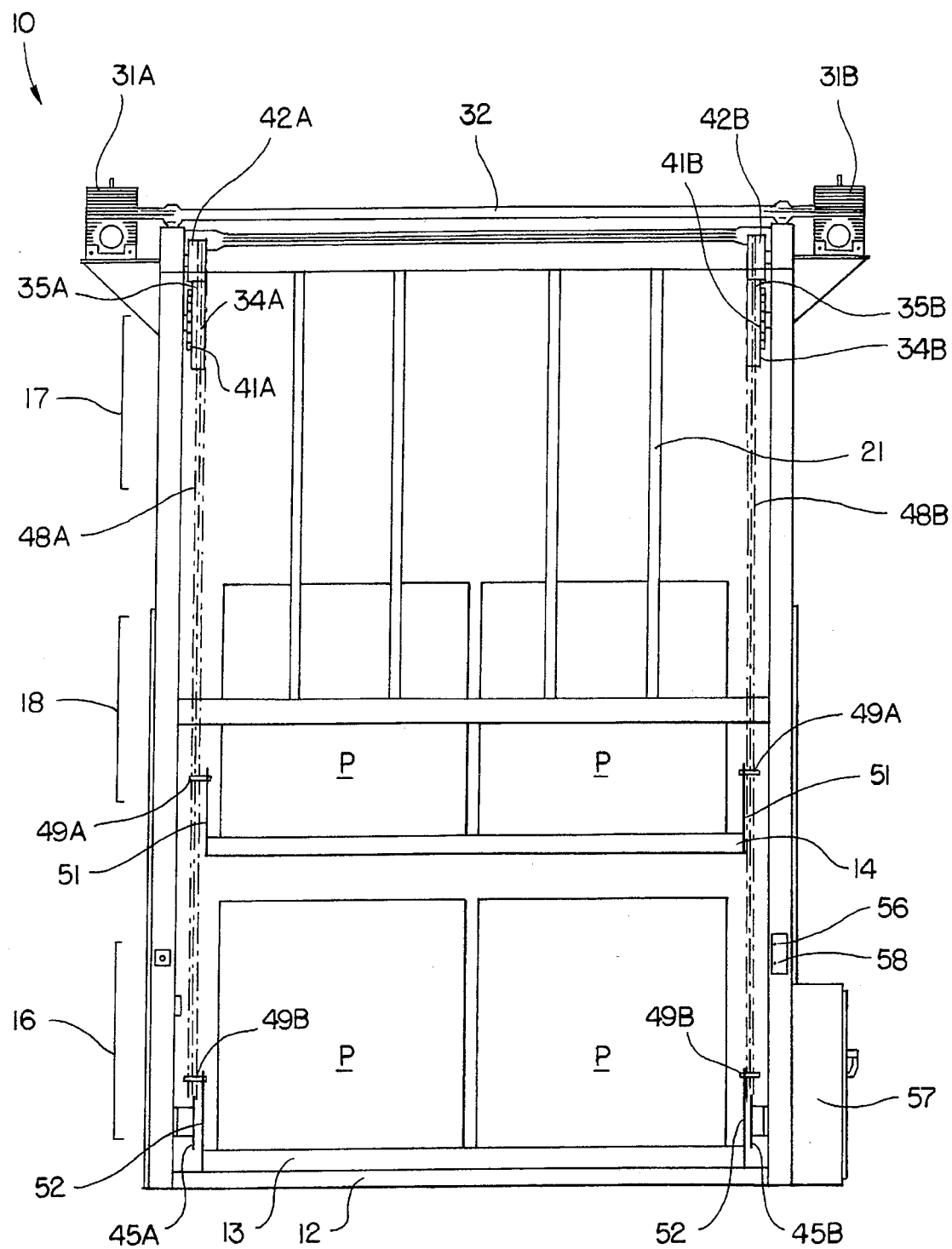
FIG. 5 is a front elevational view of the materials carrying apparatus showing the middle carrier moved downwardly into the worker access position after the materials of the bottom carrier have been exhausted.

The elevator means moves the middle carrier 13 downwardly onto the bottom carrier 12, as shown in FIG. 5. The top carrier 14 is simultaneously lowered from the first storage position 17 to the second storage position 18.

Figure 6:
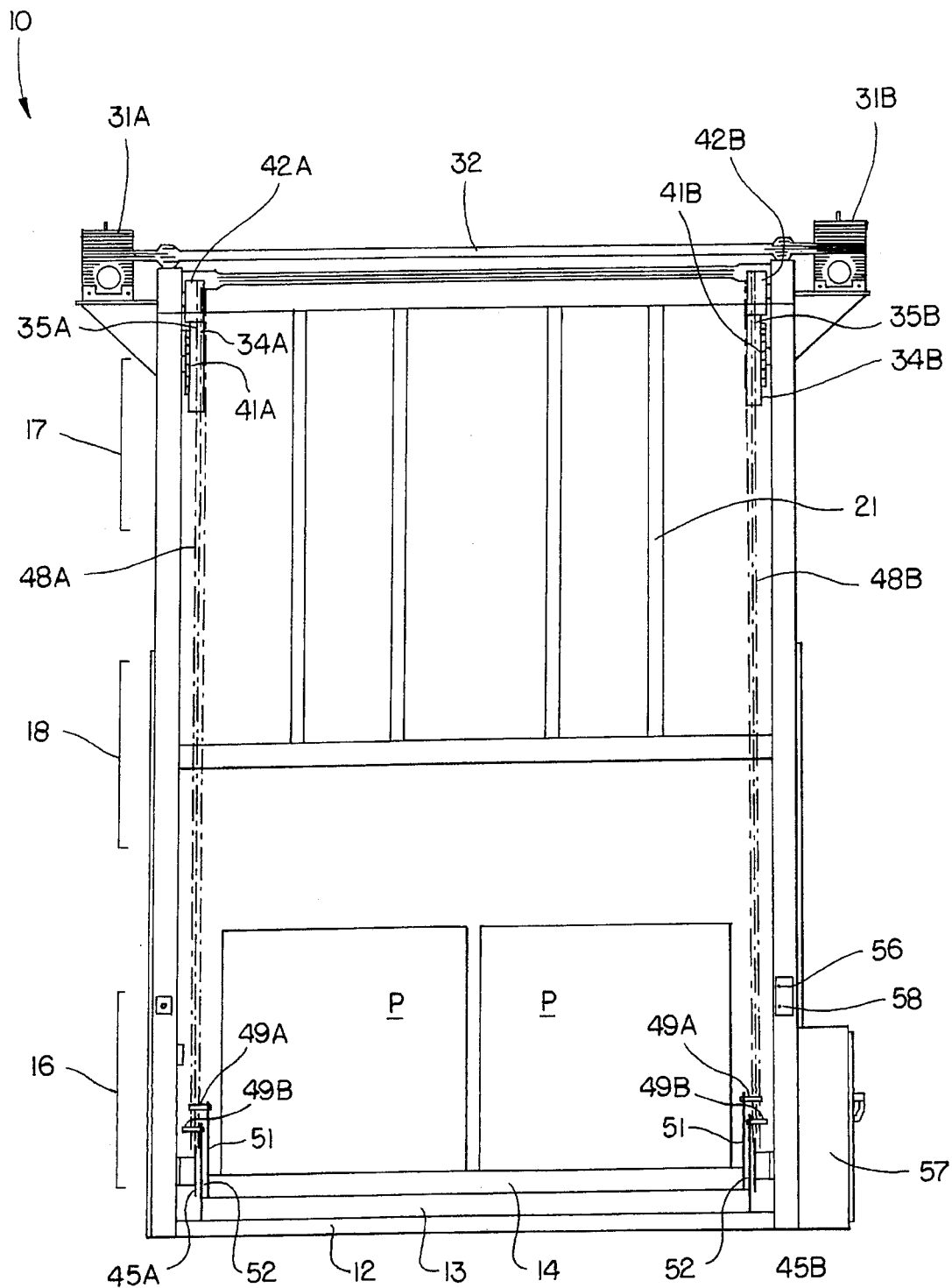
FIG. 6 is a front elevational view of the materials carrying apparatus showing the top carrier moved downwardly into the worker access position after the materials of the middle and bottom carriers have been exhausted.

When the materials of the middle carrier 13 have been exhausted, the worker again activates the control mechanism 56 to lower the top carrier 14 from the second storage position 18 to the access position 16, as shown in FIG. 6. The movement of the travel chains 48A and 48B automatically causes the second set 49B of shorter chain pins to disengage from the connecting hooks 52 of the middle carrier 13 as the top carrier 14 is lowered to the access position 16. Preferably, the top carrier 14 stacks in a nested condition on top of the middle carrier 13. The middle carrier 13 rests on top of the bottom carrier 12. The limit switch 55 deactivates the elevator means, and stops the downward movement of the carriers 13 and 14 as each is lowered into the access position 16.

To re-load the apparatus 10, materials are first placed on the top carrier 14, and a second control mechanism 58 is activated. The first set 49A of longer chain pins engage the angle support bars 51 of the carrier 14, and lift the carrier 14 upwardly to the second storage position 18 within the frame 11. The middle carrier 13 is then loaded with materials in the access position 16.

After the middle carrier 13 is fully loaded, the control mechanism 58 is again activated. The movement of the travel chains 48A and 48B cause the second set 49B of shorter chain pins to automatically reengage the connecting hooks 52 of the middle carrier 13, and lift the middle carrier 13 upwardly from the access position 16 to the second storage position 18. The top carrier 14 is simultaneously moved from the second storage position 18 to the first storage position 17. The limit switch 54 deactivates the elevator means, and stops the upward movement of the carriers 13 and 14 as they are returned to their original positions shown in FIGS. 1 and 2.

In an alternative embodiment (not shown), the apparatus may be constructed to move the carriers upwardly from a materials loading position to a worker access position located at an upper section of the frame. For example, the apparatus may be adapted to move carriers between two or more vertically spaced floor levels for access to materials by workers located on each of the different levels. The first floor level may be located in the basement of a work facility, a second floor level may be located at ground level, and a third floor level may be located on a first floor of the work facility. The worker access position may be located at either the ground floor or the first floor of the work facility with the materials loading position being located in the basement.

In addition, the apparatus may include only middle and top carriers for being located in storage positions vertically spaced apart from a supporting surface, such as the floor of the work facility. When fully loaded, the materials in a worker access position are supported directly on the floor surface. In yet another embodiment, the apparatus includes only a top carrier.

A materials carrying apparatus and method are described above. Various details of the invention may be changed without departing from its scope. Furthermore, the foregoing description of the preferred embodiment of the invention is provided for the purpose of illustration only and not for the purpose of limitation—the invention being defined by the claims.

I claim:

1. A materials carrying apparatus, comprising:

(a) a frame;

(b) a first carrier supported within said frame for carrying materials thereon, and located in an access position for access to and use of the materials by a user;

(c) a second carrier supported for vertically reciprocating movement within said frame on opposing first and second attached support hooks, and located in a storage position for carrying materials thereon, the storage position being vertically spaced apart from said access position;

(d) elevator means comprising first and second opposing, endless traveling chains operatively connected to said frame for vertically moving said second carrier from the storage position into the access position when the materials of said first carrier have been exhausted, and said first and second traveling chains including cooperating inwardly-projecting support pins for detachably engaging respective first and second hooks of said second carrier, whereby the support pins of said traveling chains automatically disengage from the hooks of said second carrier as said second carrier moves vertically from the storage position into the access position.

2. A materials carrying apparatus according to claim 1, wherein said elevator means includes a motor and a drive shaft actuated by said motor for driving said traveling chains.

3. A materials carrying apparatus according to claim 2, wherein said elevator means further includes a drive wheel, sprocket means connected to the drive wheel, and the traveling chains engaging the sprocket means and carrying the second carrier, said drive wheel being operatively connected to said drive shaft and cooperating with the sprocket means and the traveling chain for vertically moving the second carrier between the storage position and the access position.

4. A materials carrying apparatus according to claim 1, and including stop means for stopping the vertical movement of the second carrier as the second carrier moves from the storage position into the access position.

5. A materials carrying apparatus according to claim 4, wherein said stop means comprises a limit switch.

6. A materials carrying apparatus according to claim 4, and including second stop means for stopping the vertical movement of the second carrier as the second carrier returns from the access position to the storage position.

7. A materials carrying apparatus according to claim 6, wherein said second stop means comprises a limit switch.

8. A materials carrying apparatus according to claim 1, and including a third carrier supported within said frame and located in a second storage position for carrying materials thereon, the second storage position being vertically spaced apart from the access position and the first storage position, whereby said elevator means moves the second and third carriers successively into the access position when the materials of said first carrier have been exhausted.

9. A materials carrying apparatus according to claim 8, and including removable attachment means for removably attaching the third carrier to the traveling chain.

10. A materials carrying apparatus according to claim 1, wherein the access position defines a materials loading position.

11. A materials carrying apparatus, comprising:

(a) a frame;

(b) a supporting surface within said frame for carrying materials thereon, and located in an access position for access to and use of the materials by a user;

(c) a carrier supported for vertically reciprocating movement within said frame on opposing first and second attached support hooks, and located in a storage position for carrying materials thereon, the storage position being vertically spaced apart from said access position; and (d) elevator means comprising first and second opposing, endless traveling chains operatively connected to said frame for vertically moving the carrier front the storage position to the access position when the materials carried by the supporting surface have been exhausted, and said first and second traveling chains including cooperating inwardly-projecting support pins for detachably engaging respective first and second hooks of said carrier, whereby the support pins of said traveling chains automatically disengage from the hooks of said carrier as said carrier moves vertically from the storage position into the access position.

* * * * *